2 Sheets—Sheet 1.

R. DUTTON.

Mower.

No. 2,079.

Reissued Oct. 3, 1865.

Witnesses
Alfred Benson
A. G. Benson

Inventor
Rufus Dutton
By his Atty. D. Coll.

N. PETERS, Photo-Lithographer, Washington, D. C.

2 Sheets—Sheet 2.
R. DUTTON.
Mower.
No. 2,079. Reissued Oct. 3, 1865.
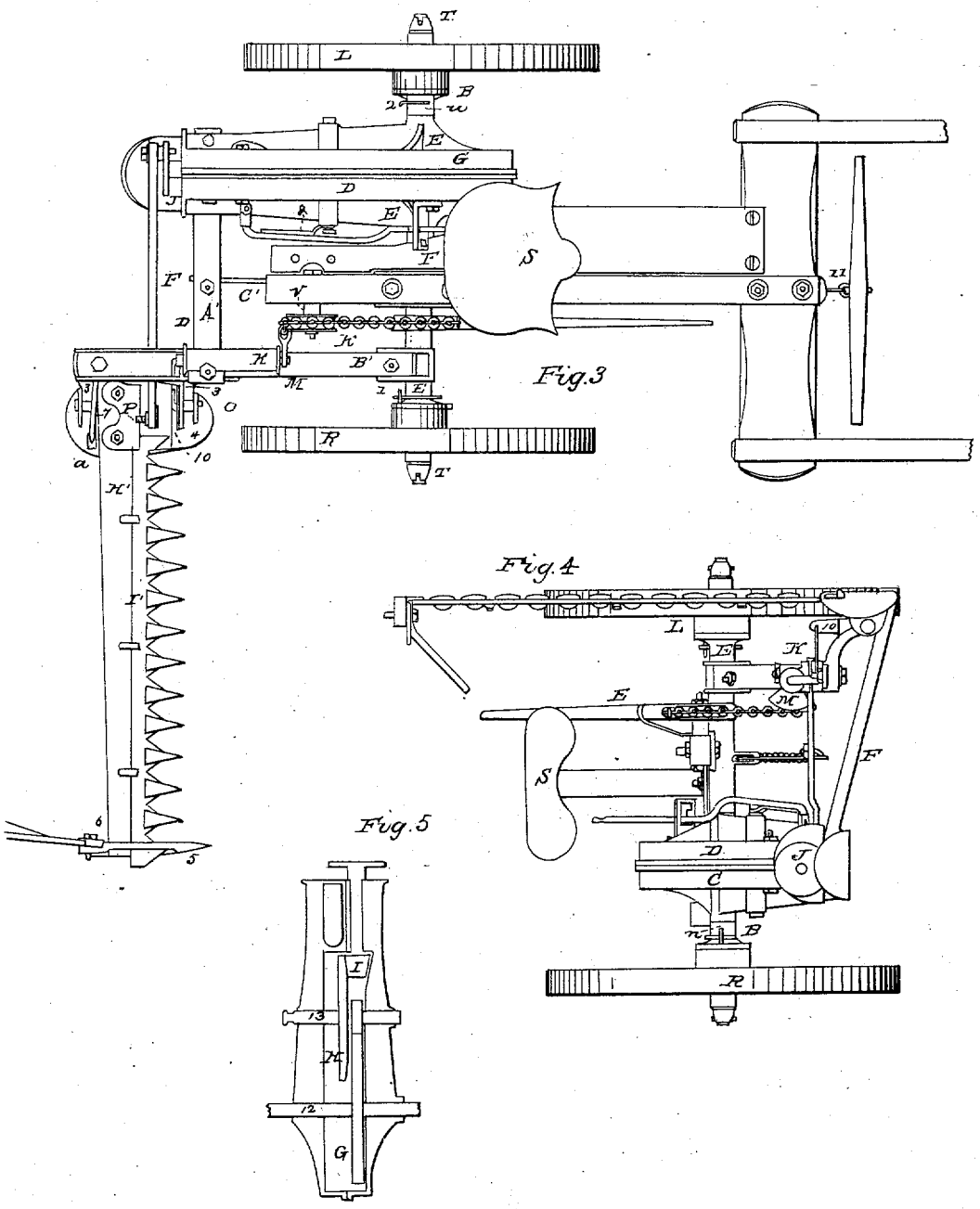
Witnesses
Alfred Benson
A. G. Benson
Inventor
Rufus Dutton
by his Atty L. D. Gale
N. PETERS, Photo-Lithographer, Washington, D. C.

UNITED STATES PATENT OFFICE.

RUFUS DUTTON AND RICHARD L. ALLEN, OF NEW YORK, N.Y., ASSIGNEES, BY MESNE ASSIGNMENTS, OF RUFUS DUTTON.

IMPROVEMENT IN MOWING-MACHINES.

Specification forming part of Letters Patent No. 41,958, dated March 15, 1864; Reissue No. 2,079, dated October 3, 1865.

*To all whom it may concern:*

Be it known that RUFUS DUTTON, now of the city and State of New York, formerly of Brooklyn, in said State, was the inventor of a new and Improved Construction of Mowing and Reaping Machines; and we do hereby declare that the following is a full, clear, and exact description thereof, reference being had to the annexed drawings, and to the letters of reference marked thereon, making a part of this specification.

Figure 1:
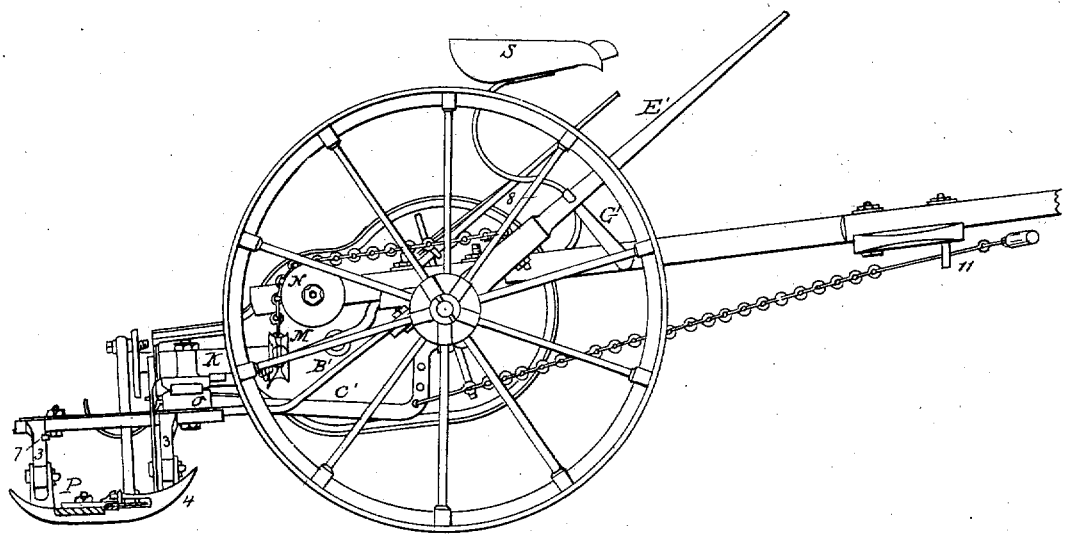
Figure 2:
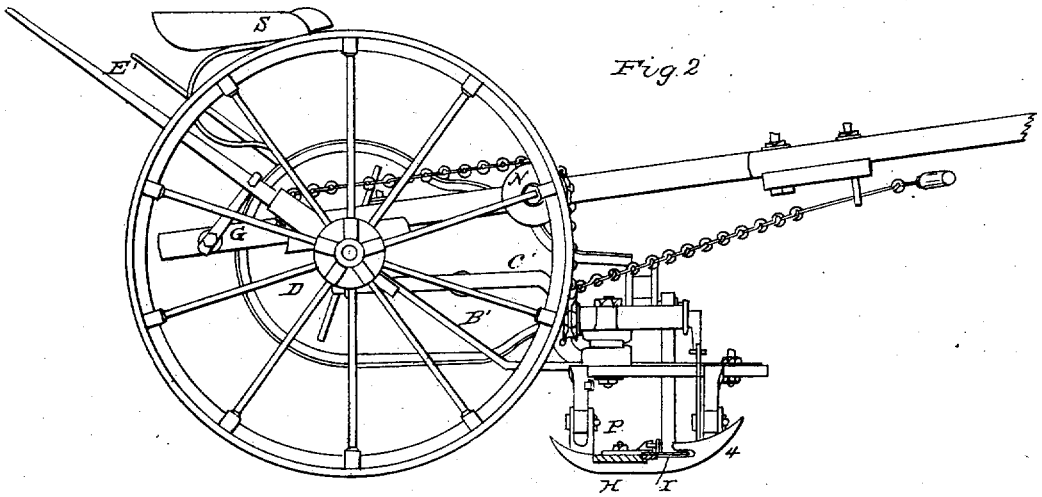

Figure 1 is a longitudinal elevation taken from the right side of the machine, the cutters being behind the wheels, constituting what is known as a "rear-side cutting-machine." Fig. 2 is a like elevation, the cutters being placed before the wheels, constituting what is known as a "front-side cutting-machine." Fig. 3 is a top view of a machine, the cutters being behind the wheels. Fig. 4 is a rear end view of the machine as seen from the ground. Fig. 5 is a sectional view, showing the arrangement of the gearing for transmitting motion to the cutters.

In the drawings the reference letters and numbers refer to the same parts in all the figures.

The said invention or improvements are applicable to both mowing and reaping machines, and have reference to the following features: to so constructing and arranging the parts of the machine that the cutters may be operated at the side of the machine, either before or behind the wheels, as may be preferred or deemed most advisable; to the means made use of for elevating and depressing the points of the guards, according as the cutters are placed behind or in front of the wheels; to the means made use of to keep the bearings or journals of the two ends of the connecting-rod parallel with each other, so as to avoid all twisting and preserve their proper elevation in each position of the cutter-bar before and behind the wheels, and in so arranging the line of draft that it shall be continually below the axle, so that the draft under all circumstances shall be upward as well as forward.

In the accompanying drawings, R represents the right wheel; L, the left wheel; C, the plain side of the gear-casing; D, the shifter side of the gear-casing; B′, the brace-bar, acting as the side piece of the frame on the right side of the machine, and extending from the axle to the shoe; A, the pawl-flange next the inner hub of the right wheel; B, the pawl-flange next the inner hub of the left wheel; E, the brace-hub; G, the spur-gear; H, spur-pinion and bevel-gear; E′, the hoist-lever; I, bevel-pinion; F, the pole-clamp; J, crank-wheel; F′, connecting-rod; K, lifter-sleeve; O, clamp of brace-bar; 3 3, double connecting knee-piece; 4, inside shoe; 5, outside shoe; 6, track-board cap; 7, shoe-hook or stop apparatus; P, heel-clamp; S, seat of the driver; T, wheel-washers; U, casing-collar; V, sheave-hub sustaining the chain for elevating the cutters; Q, forward clamp-nut of brace-bar B′; 9, draft-iron jaws on the under side of the cross-bar; 10, inside shoe-lever; H, draft rod eyebolt on the under side of the pole; A′, cross-bar; C′, draft rod or iron extending from the cross-piece to the axle; D, lifter-crank for raising the cutter-bar; G′, hook for sustaining the hoist-lever.

I. One feature of the invention has reference to so constructing and arranging the parts of the machine that the cutters can be operated either before or behind the wheels, as the operator may choose, or as may be desired under different circumstances. In two-wheeled machines as ordinarily constructed the cutters are placed at the side of the driving-wheel or at the side in front of or behind the wheel when the machine is called a "front-side" or "rear-side" cutting-machine. Each position has its advantages, according to the substance to be cut and the surface of the ground traversed. To combine the advantages of such several kinds of machines, this improved machine is so constructed that the cutter-bar and cutters may be transferred from the front to the rear of the wheels, and vice versa, according as either position may be considered preferable. To illustrate this feature of the machine, the cutter are supposed to be arranged or placed at the side of the machine behind the wheel. The gearing-case C D extends from the axle back to the connecting-rod and crank apparatus, and is bolted to the rear end piece or cross-bar A′, and that again is bolted to the shoe end of the right-side frame-piece or brace-bar B′, whose opposite end is bolted to the brace-hub E on the axle. The position of the several parts is shown in figures. The position of the cutters is changed from behind the wheels to before them in the following manner: Remove the left-hand driving-wheel L, the pawl-flange B, the casing-collar U, the plain side casing C, spur-gear G, and shifter side casing D. Then put on the casing-collar U and slide it up against the pole-clamp F. Reversing the casing sides and spur-gear, first put on the plain side casing C, then the spur-gear G, and then shifter side casing D. The pawl-flange and wheel are then replaced. Remove the knee-piece 3 3 from the brace-bar B′ and place it with the cutter-bar in front; then take the cross-bar A and turn it over and bolt it to the under side of the casing, having its upper side down. Remove the brace-bar B′ from the brace-hub E, turn over the brace-hub on the axle-tree, and again bolt the brace-bar to the upper side of the brace-hub E. Bolt the knee-piece 3 3 to the brace-bar with the short bolt in the front hole. Put the lifter-sleeve R on the top of the cross-bar, with the cross-bar clamp O between the cross-bar and the brace-bar, and bolt them together, as before. The lifter-crank D is then reversed in the lifter-sheave K. Change now the position of the lifter-sheave N and lever-hook G with each other and attach the lifting-chain to the front side of the lever. Move forward the draft-rod C′ and turn it over, putting the back end through the slot in the pole-clamp, and connect what was before the front end to the under side of the cross-bar A′. The seat may be removed to the holes back of the axle, if desired. If the directions have been strictly followed, the cutting apparatus will be changed to operate in front of the driving-wheels.

To change the position of the cutting apparatus from the front to the rear, the operation just described is reversed.

II. Another feature of the invention relates to the means used for elevating and depressing the points of the guards—that is to say, elevating them when the cutters operate behind the wheels and depressing them when the cutters are located or operate before the wheels. As the finger-bar, when it is located at the side of the machine behind the wheels, passes over irregularities of the ground higher than the plane in which the wheel turns, the points of the guards are thereby turned downward, (the axle of the wheels being the center of the arc in which the cutter-bar, rising and falling, vibrates,) and are thus liable to catch in the ground. Under such circumstances it is desirable to employ some means to elevate the points of the guards. On the other hand, when the cutting apparatus is placed in front of the wheels, the same condition of things causes the points of the guards to incline or turn upward, whereby it becomes necessary to bring them down nearly to the level with the ground. In either position of the cutter-bar there is thus a liability of an improper position of the guards from passing over inequalities in the ground. These defects are obviated by the use of the brace-bar B′ and its position with reference to the brace-hub E and the axle of the machine. When the cutters are arranged to cut behind the wheel the flange of the brace-hub E is turned so as to be above the center of the axle, and to this the upper end of the brace-bar B′ is bolted, the other end of such bar being bolted rigidly to the knee-piece 3 3, to which the shoe and finger-bar are attached. It is evident that as the upper end of the brace-bar is raised the points of the guards will be correspondingly elevated; but when the cutters are arranged to cut before the wheels the brace-hub E is turned down, bringing the flange on such hub to which the brace-bar is bolted below the center of the axle. The upper end of this brace-rod, being thus depressed, tends to correspondingly depress the points of the guards. The application of the brace-bar B′ and its change of position with respect to the axle thus elevate the points of the guard when the cutters are arranged behind the wheels, and also depresses their points when the cutters are arranged before the wheels.

III. Another feature of this invention relates to the means made use of to keep the bearings or journals of the opposite ends of the connecting-rod parallel with each other, so as to avoid twisting, and have them preserve their proper elevation in the different positions of the cutter-bar. To accomplish such end or secure such a result, the offset or curve in the cross-bar A′ is formed. When the cutting apparatus is in the rear of the driving-wheels this curve depresses the crank end of the connecting-rod sufficiently near to the horizontal line of the cutters to serve the easy movement of such connecting-rod and preserve the parallelism of the journals at the two ends of such rods. When the cutting apparatus is in front of the wheels, and it becomes necessary to elevate the crank end of the casing, this is accomplished through the bend or curve in the cross-bar A′ by turning such bar bottom side up, so that the part which was lowest before is now most elevated. The cross-bar A′, by means of the bend or curve in it, is thus made to serve the purpose of a double cross-bar, or a cross-bar in two different positions, and in each securing the parallelism of the bearings of the opposite ends of the connecting-rod.

IV. Another feature of this invention has relation to the manner of applying the draft or to the position of the line of draft. This feature of the invention has reference to machines in which the pole is not rigidly connected to the frame, but is so connected as to allow the frame to rise and fall by reason of passing over inequalities in the surface of the ground or from any other cause without affecting the pole, (and which are called "loose-pole" machines,) and which have the driver's seat supported on and controlled by the pole or any support attached to the pole, and not placed on and supported and controlled by the frame of the machine, and relates to a new and improved method of attaching the draft rod or chain directly to the shoe, or to such part of the machine or frame as receives an upward and downward motion from the shoe as the latter passes over inequalities or undulations in the ground, while at the same time the whiffletree or evener, to which the other end of the draft-rod is attached, is supported by or from the pole, with a connection that allows such whiffletree to move backward or forward when the part to which the lower ends of the draft-rod is attached rises or falls with the movements of the shoe in passing oven uneven ground. In loose-pole machines which have the shoe rigidly attached to the frame of the machine the action of the gear (which has a tendency to roll the frame on the axle) is naturally, when such a machine is arranged to cut in front of the wheels, to cause the shoe to press hard upon the ground, and thus make the draft heavy; and when such a machine is drawn by the pole or shaft there will also be a tendency that the draft pulling downward, will pull up or raise the wheels from the ground, (the shoe acting as a sort of fulcrum on or over which the power or draft acts,) thus diminishing the friction or traction of the wheels against the ground, so as in some cases to prevent the wheel driving the cutters, and to cause the wheels to slide along on the ground. In like manner, the cutters being arranged to cut behind the wheels, the action of the gear and the tendency of the draft are to raise up the shoe or reel of the finger-bar from the ground. These difficulties are obviated and overcome by keeping the line of draft continually below the axle, and this is effected by attaching the draft rod or chain directly to the shoe or to such part of the frame or coupling as receives an upward and downward motion from the shoe as this passes over any inequalities in the surface of the ground. The draft is thus continually upward, instead of having a downward direction at times, as is the case when the machine is drawn by or from the pole or shaft.

In the drawings, C′ represents the draft-rod, one end of which is attached to the cross-bar A′ by means of the draft-iron jaw 9 underneath such cross-bar, and the other end of such draft-rod passes up under the axle and rests in a slot in the pole-clamp piece F. In such draft-rod is a series of holes—one above the other—for raising and lowering the line of draft (if at any time desired) in the space between such rod and the whiffletree or evener, and which space is occupied by a chain or rod, the forward end of which connects with the whiffletree or evener, after passing through the eyebolt 1 1, which is attached to the pole of the machine; or, in place of such eyebolt, any method or plan of supporting the whiffletree or evener may be made use of which will allow the whiffletree or evener to move backward and forward as the part to which the draft-rod or chain is attached rises or falls with the shoe as the latter passes over uneven ground. Such a disposition and regulation of the line of draft, by removing the draft from the pole, causes the shoe to rest lightly and evenly upon the ground, and also relieves the horses' necks from the pressure caused by it.

Fig. 2 shows such an arrangement of the line of draft below the horizontal plane of the axle in a machine arranged to cut in front of the wheels. The action of the draft, being upward, counteracts the tendency of the action of the gear to force the shoe downward and cause it to press upon the ground. Fig. 1 shows a like disposition of the line of draft when the machine is arranged to cut behind the wheels. In such case, however, it is necessary not only to place the line of draft below the axle, but also to keep or hold it directly below the axle sufficiently far that the line of draft will not be materially affected or changed by the shoe passing over inequalities in the surface of the ground, for when the heel of the cutter or finger bar is raised by passing over any inequalities in the ground—as a hummock—and there is nothing to hold down the line of draft, there is a liability that the draft may be too much elevated or be too oblique to hold the cutters to the ground; but by keeping down the line of draft all such tendency or liability is prevented. This I accomplish by means of or by the use of an intervening link, rod, or brace below the axle and between it and the line of draft, so that the axle and its load will bear down upon the line of draft and keep it depressed. In the machine represented in the drawings such brace-rod is formed by bending up the end of the draft-rod C and attaching it to the axle or to the clamp-piece immediately under it.

It is also to be noticed that in the machine described and represented the driver's seat is not placed upon or controlled by the frame of the machine, but is supported and controlled by the tongue or pole, and this is fixed to or upon the axle. The frame of the machine can thus rise and fall in passing over inequalities in the ground without materially affecting the pole, and without being affected by the weight of the driver or causing his weight to much, if any, interfere with the proper balance of the machine.

What is claimed as new, and is desired to be secured by Letters Patent, is—

1. Changing the cutting apparatus from front to rear and from rear to front of the wheel of the machine by means of detaching and reversing the parts of the gear-casing C D, draft-rod C′, and cross-bar A′, substantially as set forth.

2. Bending the cross-bar A′, substantially as described, for the purpose of depressing the end of the casing, together with the crank-shaft, in rear-cutting machines, and elevating the same in front-cutting machines, substantially as set forth.

3. The construction of the draft-rod C′ with a bend or curve at one end, as described, whereby such rod is adapted, on being reversed, for use either in front or rear cutting machines, substantially as and for the purposes set forth.

4. So attaching the line of draft in harvesting-machines as to counteract the tendency of the gear to rotate the frame on the axle, and also prevent the shoe rising from the ground in rear-cutting and pressing or riding upon the ground in front-cutting machines, substantially as set forth.

5. In machines having two driving or supporting wheels, and also a hinged finger-bar and a loose pole, and in which the driver's seat is controlled by the pole or shafts, instead of being controlled by the frame of the machine, the frame of the machine being also supported directly from and by the axle, and not from the pole, attaching the draft rod or chain to the shoe or to such part of the frame as receives an upward-and-downward motion from the shoe as it passes over uneven ground, the whiffletree or evener, to which the forward end of the draft rod or chain is attached, being also so connected or supported from the pole or shafts that it can have a forward-and-backward movement as the shoe rises and falls, for the purposes set forth.

R. DUTTON.
R. L. ALLEN.

Witnesses:
G. D. SHAW,
JAMES T. LAW.